United States Patent
Li et al.

(10) Patent No.: US 9,049,200 B2
(45) Date of Patent: Jun. 2, 2015

(54) SYSTEM AND METHOD FOR IMPROVING HARDWARE UTILIZATION FOR A BIDIRECTIONAL ACCESS CONTROLS LIST IN A LOW LATENCY HIGH-THROUGHPUT NETWORK

(75) Inventors: Mingzhe Li, Fremont, CA (US);
Alessandro Fulli, San Jose, CA (US);
Putu Harry Subagio, Cupertino, CA (US); Chih-Tsung Huang, Burlingame, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 41 days.

(21) Appl. No.: 13/560,154

(22) Filed: Jul. 27, 2012

(65) Prior Publication Data

US 2014/0032591 A1    Jan. 30, 2014

(51) Int. Cl.
| | |
|---|---|
| H04L 12/28 | (2006.01) |
| H04L 9/32 | (2006.01) |
| H04N 7/16 | (2011.01) |
| G06F 17/30 | (2006.01) |
| H04L 29/06 | (2006.01) |

(52) U.S. Cl.
CPC .......... *H04L 63/101* (2013.01); *H04L 63/0236* (2013.01); *G06F 17/30595* (2013.01)

(58) Field of Classification Search
CPC ..................................................... G06F 17/30
USPC ............ 707/10; 370/452, 230, 401, 389, 351, 370/392; 709/224, 225; 711/108; 365/49.1
See application file for complete search history.

(56) References Cited

U.S. PATENT DOCUMENTS

| | | |
|---|---|---|
| 6,377,577 B1 | 4/2002 | Bechtolsheim et al. |
| 7,023,853 B1 | 4/2006 | Bechtolsheim et al. |
| 7,024,515 B1 | 4/2006 | Ruan et al. |
| 7,249,228 B1 | 7/2007 | Agarwal et al. |
| 7,304,996 B1 | 12/2007 | Swenson et al. |
| 7,324,514 B1 | 1/2008 | Haq et al. |

(Continued)

FOREIGN PATENT DOCUMENTS

WO    WO 2014/018254    1/2014

OTHER PUBLICATIONS

Cisco Systems, Inc., "Configuring Commonly Used IP ACLs," Document ID 26448, ©2010-2011, Updated Jan. 28, 2008, 12 pages; http://www.cisco.com/en/US/tech/tk648/tk361/technologies_configuration_example09186a0080100548.shtm.
Cisco Systems, Inc., "Configuring IP Access List," Document ID 23602, ©2009-2010, Updated Dec. 27, 2007, 18 pages; http://www.cisco.com/en/US/products/sw/secursw/ps1018/products_tech_note09186a00800a5b9a.shtml.

(Continued)

*Primary Examiner* — Alpus H Hsu
*Assistant Examiner* — Camquyen Thai
(74) *Attorney, Agent, or Firm* — Patent Capital Group

(57) ABSTRACT

A method in an example embodiment includes creating a first search key from variable data of a message received in a network environment, creating a second search key from constant data of the message, identifying a first database entry in a first database based on the first search key, and identifying a second database entry in a second database based on the second search key. The method can also include performing an action associated with the first database entry when a correlation is identified between the first and second database entries. In specific embodiments, the variable data are modified and the constant data are not modified. The first search key can be created prior or subsequent to forwarding the message. In further embodiments, the correlation is identified when an offset of the first database entry is the same as an offset of the second database entry.

19 Claims, 4 Drawing Sheets

(56) References Cited

U.S. PATENT DOCUMENTS

| | | | |
|---|---|---|---|
| 8,176,242 B1* | 5/2012 | Shamis et al. | 711/108 |
| 8,619,562 B1* | 12/2013 | Krivitski et al. | 370/230 |
| 2002/0046209 A1* | 4/2002 | De Bellis | 707/10 |
| 2002/0186705 A1* | 12/2002 | Kadambi et al. | 370/452 |
| 2003/0123459 A1* | 7/2003 | Liao | 370/401 |
| 2003/0225881 A1* | 12/2003 | Saxena et al. | 709/224 |
| 2007/0067478 A1* | 3/2007 | Verplanken et al. | 709/231 |
| 2008/0049774 A1* | 2/2008 | Swenson et al. | 370/412 |
| 2010/0080223 A1 | 4/2010 | Wong et al. | |
| 2012/0324204 A1* | 12/2012 | Inoue | 711/200 |
| 2013/0036151 A1* | 2/2013 | Goyal et al. | 709/201 |
| 2013/0058250 A1* | 3/2013 | Casado et al. | 370/254 |
| 2013/0246377 A1* | 9/2013 | Gaitonde | 707/697 |

OTHER PUBLICATIONS

PCT Feb. 18, 2014 International Search Report and Written Opinion of the International Searching Authority for International Application Serial No. PCT/US2013/049785.

Cisco Systems, Inc., "Chapter 20: Configuring ACLs," Cisco Nexus 500 Series NX-OS Software Configuration Guide, Release 4.0(1a)N2(1), Jun. 2009; 19 pages http://www.cisco.com/en/US/docs/switches/datacenter/nexus5000/sw/configuration/guide/cli_rel_4_0_1a/sec_ipacls.html.

PCT Feb. 5, 2015 International Preliminary Report on Patentability and Written Opinion of the International Searching Authority from International Application Serial No. PCT/US2013/049785.

* cited by examiner

US 9,049,200 B2

SYSTEM AND METHOD FOR IMPROVING HARDWARE UTILIZATION FOR A BIDIRECTIONAL ACCESS CONTROLS LIST IN A LOW LATENCY HIGH-THROUGHPUT NETWORK

TECHNICAL FIELD

This disclosure relates in general to the field of computer networks and, more particularly, to a system and a method for improving hardware utilization for a bidirectional access control list in a low latency high-throughput network.

BACKGROUND

Computers and computer networking have become an integral part of daily life in today's society. Most organizations rely on computer networks to enable sharing resources and information to advance the purposes of the organization. A typical computer network can include terminal endpoints (e.g., laptops, personal computers, smartphones, etc.), and network elements such as routers, switches, gateways, servers, etc.

Various security mechanisms may be employed to protect a network and its various components. An Access Control List (ACL) is a common network security mechanism used extensively in modern networks for security purposes and content aware networking. ACL allows network policies to be applied on ingress when traffic is received on an incoming interface of a network element, and on egress when traffic is transmitted on an outgoing interface of a network element. A basic level of security for accessing the network or portions of the network can be achieved by using ACL to apply policies (or ACL rules) to network traffic. As networks scale upwardly, however, more policies are typically needed, and this may be constrained by the hardware resources of the network. Accordingly, the ability to upwardly scale networks using ACL, without sacrificing network performance or security, presents a significant challenge to component manufacturers and network operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

A method is provided in one example embodiment and includes creating a first search key from one or more variable data of a message received in a network environment and creating a second search key from one or more constant data of the message. The method also includes identifying a first database entry in a first database based on the first search key and identifying a second database entry in a second database based on the second search key. The method further includes performing an action associated with the first database entry when a correlation is identified between the first and second database entries. In specific embodiments, when the message is forwarded, the one or more variable data are modified and the one or more constant data are not modified. In some embodiments, the first search key is created prior to forwarding the message. In other embodiments, the first search key is created after forwarding the message. In further embodiments, the correlation is identified when an offset of the first database entry in the first database is the same as an offset of the second database entry in the second database. Additional features of the first database entry include a valid field and a variable field, and the first database entry is not identified when the valid field of the first database entry is not set.

Example Embodiments

Figure 1:
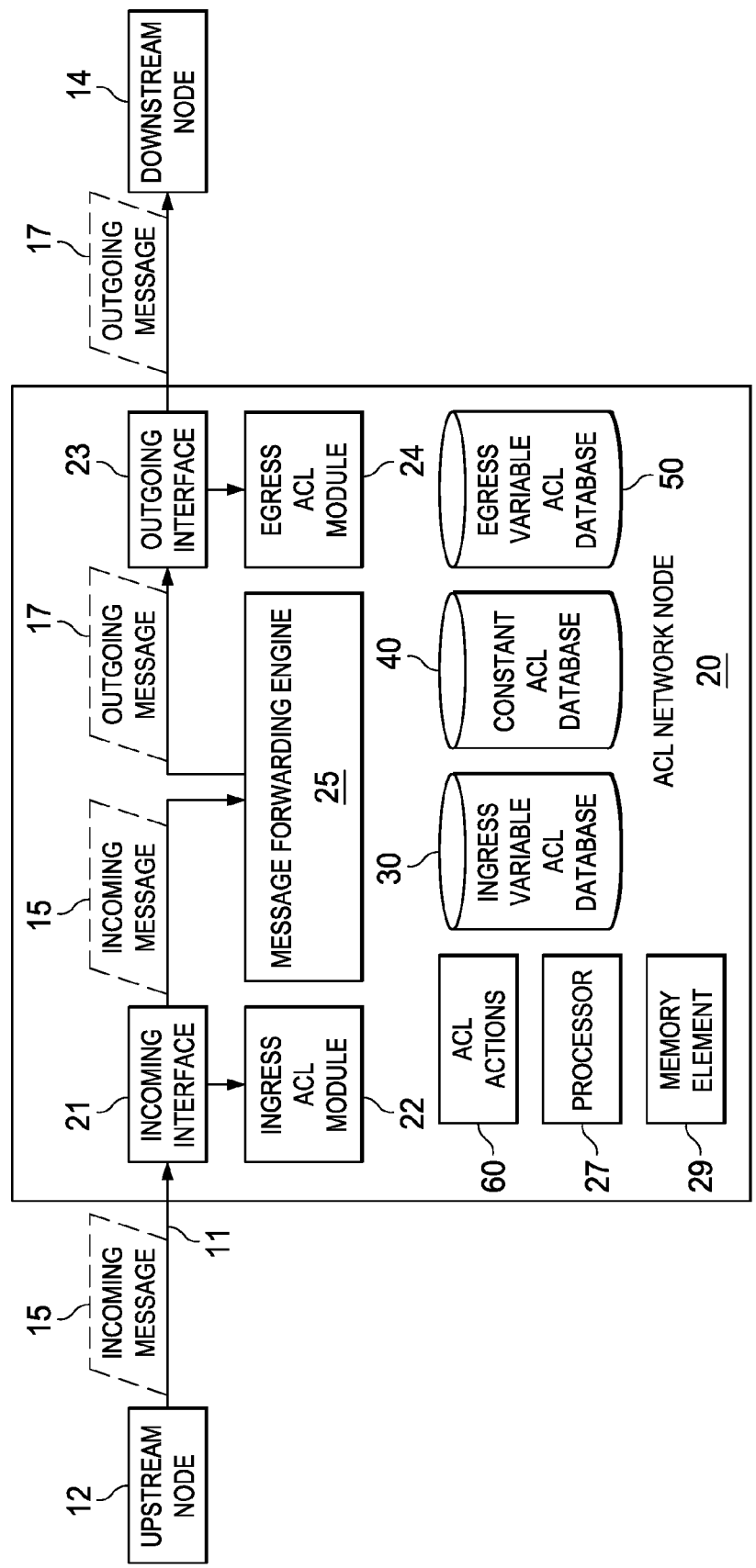
FIG. 1 is a simplified block diagram illustrating components of an example system for improving hardware utilization for a bidirectional access control list (ACL) in a low latency high-throughput network in accordance with embodiments of the present disclosure.

FIG. 1 is a simplified block diagram of an example implementation of a system 10 for improving hardware utilization for a bidirectional access control list (ACL) in a network environment. The exemplary network environment may comprise a low latency, high-throughput network 11 that includes an upstream node 12, a downstream node 14, and an ACL network node 20. ACL network node 20 can be configured to receive, forward, and send messages between nodes 12 and 14, respectively. For example, ACL network element 20 can receive incoming messages 15 from upstream node 12, apply forwarding techniques to the messages based on particular protocols being used, and send corresponding outgoing messages 17 to downstream node 14. ACL network element 20 can include an incoming interface 21, an outgoing interface 23, a message forwarding engine 25, a processor 27, and a memory element 29. Additionally, ACL network element 20 may include other components associated with applying ACL policies (or rules) such as an ingress ACL module 22, an egress ACL module 24, an ingress variable ACL database 30, a constant ACL database 40, and an egress variable ACL database 50. Additionally, ACL actions 60 can be provided and are associated with ACL rules in ingress variable ACL database 30 and egress variable ACL database 50. ACL actions 60 include permitting, denying, or otherwise suitably controlling network traffic (i.e., messages) on network node 20, which can be achieved by using access list commands.

Elements of FIG. 1 may be coupled to one another through one or more interfaces (e.g., incoming interface 21, outgoing interface 23, etc.) employing any suitable connection (wired or wireless), which provides a viable pathway for electronic communications. Additionally, any one or more of these elements may be combined or removed from the architecture based on particular configuration needs.

Certain terminologies are used herein with regard to the various embodiments of the present disclosure. The term 'data' as used herein, refers to any type of binary, numeric, voice, video, textual, or script data, or any type of source or object code, or any other suitable information in any appropriate format that may be communicated from one point to another in electronic devices (e.g., nodes) and/or networks. The term 'message' as used herein is intended to include data formatted for transmission in a packet switched network environment, using any suitable protocol in accordance with the present disclosure. For instance, messages could include frames, headers, packets or datagrams, segments, application data, etc., depending on the particular communication protocols that may be implemented.

For purposes of illustrating the operational aspects of system 10, it is important to understand the communications that may be traversing the network. The following foundational information may be viewed as a basis from which the present disclosure may be properly explained. Such information is offered for purposes of explanation only and, accordingly, should not be construed in any way to limit the broad scope of the present disclosure and its potential applications.

Access control lists (ACLs) are used extensively in modern networks for security purposes and content aware networking. ACLs are often implemented in network elements having at least layer 3 capabilities of the Internet Protocol Suite (TCP/IP) to provide traffic filtering. Network policies may be applied on ingress when network traffic is received on an incoming interface and/or on egress when network traffic is to be transmitted on an outgoing interface. More particularly, network policies can be configured as rules of an ACL to control network traffic flow both into and out of a network element (e.g., server, router, switch, etc.). For example, rules can be applied to port numbers of the network element to prevent certain traffic from entering or exiting a network, to prevent certain network traffic from being forwarded to various parts of the network, or to allow certain traffic to access a network or portions thereof.

Generally, a bidirectional ACL consists of two independent sets of ingress and egress ACL rules. The different sets of ACL rules are traditionally stored in separate databases. An ingress ACL database can be used for capturing incoming frames of messages that match one or more ingress ACL rules. Conversely, an egress ACL database can be used for capturing outgoing frames of messages that match one or more egress ACL rules. In a hardware implementation, two separate databases are used to allow two searches through the databases (i.e., one search of an ingress ACL database and one search of an egress ACL database), per message.

Each entry in a typical ACL database represents an ACL rule and includes fields for matching information contained in the current message being evaluated. Message information may have different properties such as constant data that does not change before or after forwarding, and variable data that may change before or after forwarding. Constant data can include, for example, higher layer fields (e.g., transport layer or layer 4), which are generally not rewritten by a layer 2 or layer 3 network element (e.g., layer 2 switch, multilayer switch, router, etc.). Variable data can include lower layer fields such as layer 2 or possibly layer 3 fields. An example of variable data can be a broadcast domain when a network element such as a router or a multilayer switch routes messages received from a virtual local area network (VLAN) having one broadcast domain to a different VLAN having another broadcast domain. As used herein, 'forwarding' messages is intended to refer to bridging or routing messages by a network element (e.g., providing the messages with new headers, frames, network addresses, etc.) prior to sending, transmitting, or otherwise communicating the messages to another network node. Additionally, 'forwarding' may also indicate that the message has been provided to an outgoing interface of a network element.

In a conventional bidirectional ACL implementation, an ACL rule contains fields that may be classified as either constant or variable. In particular, each entry in an ingress ACL database includes both ingress variable fields and constant fields, while each entry in an egress ACL database includes both egress variable fields and constant fields. Thus, constant fields may be duplicated in the ingress and egress ACL databases.

Two searches are usually performed for each message. For an incoming message, a database may be searched with an ingress search key containing variable and constant search key fields derived from the incoming message, to determine whether an ingress ACL rule is applicable. After the incoming message has been forwarded, the egress ACL database may be searched with an egress search key containing variable and constant search key fields derived from the corresponding forwarded (or outgoing) message, to determine whether an egress ACL rule is applicable. Two separate searches are needed because the ingress and egress search keys may change post forwarding, depending on the variable data of the message.

The duplication of the constant fields in the ingress and egress ACL databases and the multiple searches over these duplicate constant fields, can inhibit upward network scaling of a network. As networks scale, more network policies may be needed, which results in larger ACL databases. While the growth of the ACL databases may be desirable (e.g., to provide network security and allow upward network scaling), such ACL expansion may be limited by hardware constraints, particularly for hardware-based ACLs. Thus, it is important to maximize the utilization of hardware resources to achieve the greatest total number of ingress and egress ACL rules in a bidirectional ACL.

Maximizing hardware utilization, however, may impact latency and throughput of the network. Latency refers to the average processing delay per message and throughput refers to the number of messages processed per time period. In a low latency high throughput network, increasing hardware utilization to allow for a larger bidirectional ACL at the expense of higher latency and/or lower throughput is not desirable.

Like hardware-based ACLs, software-based ACLs can also inhibit network scaling. Software-based ACLs may suffer from greater software search times due to the duplicate constant fields in both the ingress and egress ACL databases. Thus, to meet a diverse set of deployment needs, it is important that a bidirectional ACL provides the maximum possible number of programmable bidirectional ACL rules, given a finite quantity of hardware resources.

In accordance with embodiments described herein, system 20 can resolve the aforementioned issues (and more) associated with access control lists (ACLs). More specifically, the bidirectional ACL of system 10 can achieve significant overhead reduction in the form of a smaller hardware footprint or software search time by eliminating the duplication of constant fields in ingress and egress ACL databases. In system 10, a bidirectional ACL is implemented with three ACL databases, to enable separate searches of ingress variable fields, egress variable fields, and constant fields. The implementation of a separate database for the constant fields (e.g., constant ACL database 40) enables the constant ACL database to be searched a single time for a given message using a search key derived from constant data in the message. A resulting constant match vector can be shared with search results of ingress variable ACL database and of egress variable ACL database. Implementing a shared constant ACL database eliminates duplicate storage and duplicate searches of the constant fields. Accordingly, the total number of ingress and egress ACL rules can be increased, and potentially almost doubled, without impacting latency and throughput. Moreover, the incremental hardware cost is minimized with the utilization of a shared constant ACL database, thereby improving hardware utilization. In addition, for software-based bidirectional ACLs, avoiding a second search through the constant fields may also reduce search time.

Turning to the infrastructure of FIG. 1, FIG. 1 is a simplified block diagram of one example implementation of system 10. Network 11 can include a series of points or nodes of interconnected communication paths for receiving and transmitting messages of information that propagate through system 10. Network 11 offers communicative interfaces between nodes such as incoming and outgoing interfaces 21 and 23 of ACL network node 20. Network 11 may be any local area network (LAN), wireless local area network (WLAN), metropolitan area network (MAN), Intranet, Extranet, WAN, virtual private network (VPN), or any other appropriate architecture or system that facilitates communications in a network environment.

System 10 may be configured to operate in conjunction with any suitable communication protocols for transmitting and receiving messages in a network, in which messages that are received by ACL network node 20 can include some data that changes after forwarding (i.e., variable data) and some data that remains constant after forwarding (i.e., constant data). In particular, system 10 may be configured to accommodate any protocol based upon Open Systems Interconnection (OSI) model, which can include a physical layer (layer 1), a data link layer (layer 2), a network layer (layer 3), a transport layer (layer 4), a session layer (layer 5), a presentation layer (layer 6), and an application layer (layer 7), or any suitable combination thereof. Messages can include multiple layers with higher layers being encapsulated within lower layers. As used herein, a 'packet' refers to layer 3 with network addressing, which can encapsulate layers 4 and higher. Also, a 'frame' as used herein, refers to layer 2 with a frame header and a frame footer, which can encapsulate a packet. By way of example, in certain implementations of system 10, network 11 may implement User Datagram Protocol/Internet Protocol (UDP/IP) connections or Transmission Control Protocol/Internet Protocol (TCP/IP) connections for the electronic transmission and reception of messages in the network.

Upstream and downstream nodes 12 and 14 can be network elements, which are meant to encompass network appliances, servers, routers, switches, gateways, bridges, loadbalancers, processors, modules, or any other suitable device, component, element, or object operable to exchange information (e.g., in the form of messages) in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Upstream and downstream nodes 12 and 14 may also be representative of a network endpoint such as a mobile device (e.g., smartphone, tablet, personal digital assistant (PDA), etc.) and end user equipment (e.g., laptop, personal computer, etc.).

ACL network node 20 could be any network element in which access control lists can be implemented and in which some data in a received message is not affected when forwarding (i.e., bridging or routing) the message, and some data in the received message is modified when forwarding the message. For example, ACL network node 20 may commonly be configured as an L2 switch, and L2/L3 switch, a router, or a gateway. Incoming and outgoing interfaces 21 and 23 may be any suitable combination of network interface controllers (NICs) and/or wireless network interface controllers (WNICs) that enable communication to other network nodes.

Regarding the internal structure associated with ACL network node 20, it can include memory element 29 for storing information to be used in the operations outlined herein. ACL network node 20 may keep information in any suitable type of memory element (e.g., random access memory (RAM), read-only memory (ROM), erasable programmable ROM (EPROM), electrically erasable programmable ROM (EEPROM), application specific integrated circuit (ASIC), ternary content addressable memory (TCAM), etc.), software, hardware, or in any other suitable component, device, element, or object where appropriate and based on particular needs. Any of the memory items discussed herein (e.g., memory element 29) should be construed as being encompassed within the broad term 'memory element.' The information being used, tracked, forwarded, sent, or received by upstream node 12, downstream node 14, and ACL network node 20 could be provided in any database, register, queue, table, cache, control list, vector, or other storage structure, all of which can be referenced at any suitable timeframe. Any such storage options may be included within the broad term 'memory element' as used herein.

Note that in certain example implementations, the functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, memory elements (e.g. memory element 29) can store data used for the operations described herein. This includes the memory elements being able to store software, logic, code, or processor instructions that are executed to carry out the activities described herein.

ACL network node 20 can include a processor 27, which can execute logic, software, or an algorithm to perform activities as discussed herein. A processor can execute any type of instructions associated with the data to achieve the operations detailed herein. In one example, processor 27 (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Not shown in FIG. 1 is additional hardware that may be suitably coupled to processor 27 and other components in the form of memory management units (MMU), additional symmetric multiprocessing (SMP) elements, physical memory, peripheral component interconnect (PCI) bus and corresponding bridges, small computer system interface (SCSI)/integrated drive electronics (IDE) elements, etc. ACL network node 20 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in ACL network node 20 to appropriately manage the operation of the hardware components therein.

The elements, shown and/or described with reference to ACL network node 20 are intended for illustrative purposes and are not meant to imply architectural limitations. In addition, ACL network node 20 may include more or less components where appropriate and based on particular needs.

As illustrated in FIG. 1, incoming message 15 can be received by ACL network node 20 at incoming interface 21 from upstream node 12. Ingress ACL rules that apply to incoming message 15 can be identified by ingress ACL module 22, using ingress variable ACL database 30 and constant ACL database 40. If an applicable ingress ACL rule is identified, then an associated ACL action (e.g., permit traffic, deny traffic, etc.) can be performed. If incoming message 15 is not dropped or otherwise blocked or if network traffic is explicitly permitted in accordance with ingress ACL rules, message forwarding engine 25 can perform appropriate bridging or routing functions on incoming message 15. For example, a frame header and footer of incoming message 15 can be removed and a new frame header and footer can be added to encapsulate a packet, thereby changing at least some of the variable data of the message. Thus, outgoing message 17 can be the incoming message 15 with modified variable data. Egress ACL rules that apply to outgoing message 17 can be identified by egress ACL module 24, using egress variable ACL database 50 and the previous search results of constant ACL database 40. If an applicable egress ACL rule is identified, then an associated action (e.g., permit traffic, deny traffic, etc.) can be performed. If outgoing message 17 is not dropped or otherwise blocked or if network traffic is explicitly permitted in accordance with egress ACL rules, then outgoing message 17 can be transmitted, sent, or otherwise communicated to downstream node 14.

Upstream and downstream nodes 12 and 14 are provided for illustrative purposes only, and it will be apparent that each of nodes 12 and 14 could be configured to function as both an upstream and downstream node relative to ACL network node 20. More specifically, each node 12 and 14 could be configured to send communications to ACL network node 20 and receive communications from ACL network node 20.

Figure 2:
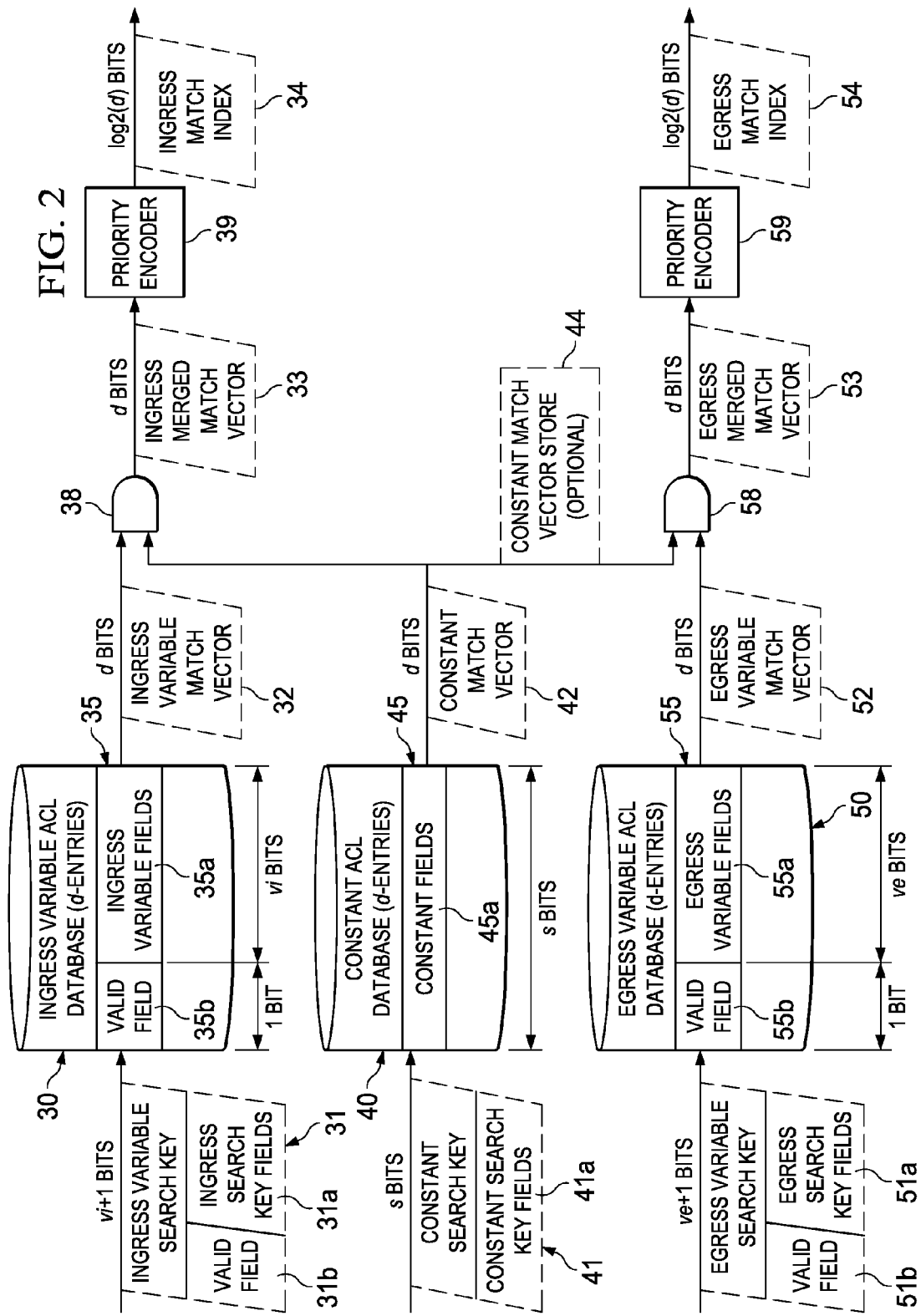
FIG. 2 is a simplified block diagram showing additional details of example components of the system of FIG. 1.

Turning to FIG. 2, FIG. 2 is a simplified block diagram illustrating additional details of components of ACL network node 20, when the bidirectional ACL of system 10 is implemented in hardware. Generally, on the ingress side, ingress variable ACL database 30 is searched with a search key 31 derived from variable data of a message prior to forwarding (e.g., incoming message 15). Constant ACL database 40 is searched with a search key derived from constant data of the message. Ingress variable ACL database 30 and constant ACL database 40 feed search results in the form of match vectors to an AND gate 38 to determine whether any ingress ACL rules apply to the message. The results of AND gate 38 can be fed to a priority encoder 39 to determine the highest priority ingress ACL rule that was identified in the searches.

On the egress side, egress variable ACL database 50 is searched with a search key 51 derived from variable data of the message after forwarding (e.g., outgoing message 17). Egress variable ACL database 50 and constant ACL database 40 feed search results in the form of match vectors to an AND gate 58 to determine whether any egress ACL rules apply to the message. The results of AND gate 58 can be fed to a priority encoder 59 to determine the highest priority egress ACL rule that was identified in the searches.

With more specific reference to the details of the example components shown in FIG. 2, ingress and egress variable ACL databases 30 and 50 have entries that correspond to entries of constant ACL database 40. The combination of a variable database entry (e.g., ingress variable database entry 35 or egress variable database entry 55) and a corresponding constant database entry (e.g., constant database entry 45) can represent an ingress or egress ACL rule. The ingress or egress rule is applicable to a given message if both parts (i.e., the variable database entry and the corresponding constant database entry) are identified during a search of the databases. When an ingress variable database entry and a constant database entry are identified during a search for a particular message, a correlation between the identified database entries indicates that the entries are corresponding entries, and thus represent an ingress ACL rule that applies to the message. Similarly, when an egress variable database entry and a constant database entry are identified during a search for a particular message, a correlation between the identified database entries indicates that the entries are corresponding entries, and thus represent an egress ACL rule that applies to the message.

In one example configuration, the three ACL databases 30, 40 and 50 may have the same number of entries (e.g., d-entries: entry 0 through entry d−1), and correlations between entries in the variable databases and entries in the constant database are based on the entries having the same offsets in the different databases. In the example shown in FIG. 2, representative $n^{th}$ entries 35, 45, and 55 are illustrated in databases 30, 40, and 50, respectively, with n representing the same offset (e.g., one of 0 through d−1) in each database 30, 40, and 50. Thus, in this example configuration, ingress variable database entry 35 and constant database entry 45 are corresponding entries and together represent an ingress ACL rule. Additionally, egress variable database entry 55 and constant database entry 45 are also corresponding entries and together represent an egress ACL rule. These ingress and egress ACL rules share the same constant database entry 45 and are, therefore, bidirectional. In addition, both ingress and egress ACL rules may be associated with actions in ACL actions 60 such as denying network traffic, permitting network traffic, etc.

FIG. 2, therefore, illustrates an embodiment in which corresponding entries of databases 30 and 40 are correlated because they are located at the same offsets in their respective databases, and corresponding entries of databases 50 and 40 are correlated because they are located at the same offsets in their respective databases. It will be apparent, however, that any suitable configuration may be implemented to indicate appropriate correlations between entries in the variable ACL databases and entries in the constant database.

Each entry in ingress variable ACL database 30 may have the configuration of ingress variable database entry 35, including a valid field 35b and ingress variable fields 35a. Valid field 35b may be 1 bit in length, while ingress variable fields 35a may be vi bits in length. Similarly, each entry in egress variable ACL database 50 may have the configuration of egress variable database entry 55, including a valid field 55b and egress variable fields 55a. Valid field 55b may be 1 bit in length, while egress variable fields 55a may be ve bits in length. Thus, the length of ingress variable fields 35a may be the same or different than the length of egress variable fields 55a. Moreover, ingress variable fields 35a and egress variable fields 55a may each be configured as a single variable field or multiple variable fields. Finally, each entry in constant ACL database 40 may have the configuration of constant database entry 45, including s bits of one or more constant fields 45a.

Search keys may have the same configurations as the database entries of their respective ACL databases. Ingress variable search key 31 may have the same configuration as database entries (e.g., entry 35) of ingress variable ACL database 30, and egress variable search key 51 may have the same configuration as database entries (e.g., entry 55) of egress variable ACL database 50. Ingress variable search key 31 may include a valid field 31b and ingress search key fields 31a. Valid field 31b may be 1 bit in length, while ingress search key fields 31a may be vi bits in length. Similarly, egress variable search key 51 may include a valid field 51b and egress search key fields 51a. Valid field 51b may be 1 bit in length, while egress search key fields 51a may be ve bits in length. Constant search key 41 may have the same configuration as database entries (e.g., entry 45) of constant ACL database 30. Constant search key 41 may include constant search key fields 41a, which may be s bits in length.

Ingress and egress variable fields of variable database entries (e.g., ingress and egress variable fields 35a and 55a of entries 35 and 55, respectively) are data fields that contain possible values of search key fields 31a and 51a of search keys 31 and 51, respectively. Ingress search key fields 31a can be derived from one or more variable data of a message prior to forwarding the message. Egress search key fields 51a can be derived from one or more variable data of the message after the message is forwarded. As used herein, 'variable data' of a message is data that changes in value by the forwarding logic of message forwarding engine 25. Consequently, egress search key fields 51a may be modified in value from ingress search key fields 31a for the same message.

Constant fields of constant database entries (e.g., constant fields 45a of entry 45) are data fields that contain possible values of constant search key fields 41a of constant search key 41. Constant search key fields 41a can be derived from one or more constant data of a message. As used herein, 'constant data' of a message is data that does not change in value by the forwarding logic of message forwarding engine 25. Accordingly, constant search key fields 41a can be derived from a message prior to forwarding, and the results of the constant ACL search can be merged with the results of an ingress ACL search and the results of an egress ACL search because constant search key 41 is unchanged since the constant data of the message remains unchanged.

In example embodiments of system 10, the three databases 30, 40, and 50 are implemented to enable separate searches using the separate search keys 31, 41, and 51, respectively. Depending upon the particular implementation and protocol, variable search key fields and constant search key fields may be derived from various layers of a message in order to create the search keys. By way of example, in a TCP/IP protocol, ingress search key fields 31a can be derived from variable data in layer 2 and/or in layer 3 of a message (e.g., incoming message 15) prior to forwarding. Ingress variable search key 31 may also be configured with valid field 31b for comparison with valid fields such as valid field 35b. Similarly, egress search key fields 51a can be derived from variable data in layer 2 and/or layer 3 of the message (e.g., outgoing message 17) after the message is forwarded and provided to outgoing interface 23. Egress variable search key 51 may also be configured with a valid field for comparison with valid fields such as valid field 55b. Finally, constant search key fields 41a can be derived from constant data in layers 4, 5, 6, and/or 7 of the message.

In the example embodiment shown in FIG. 2, a match vector is generated from each ACL database search. A match vector generated from a search of an ACL database is a vector of bits with each bit representing one of the database entries in the searched ACL database. The value of each bit in the match vector indicates whether the search key produced a 'hit' or a 'miss' on the corresponding database entry. For instance, a binary '0' could indicate the search key did not match (or 'missed') the corresponding database entry, whereas a binary '1' could indicate the search key matched (or 'hit') the corresponding database entry. It will be apparent that the bits could be configured to indicate a hit or a miss with reverse values (i.e., binary '0' indicating a hit and binary '1' indicating a miss). Additionally, the bit positions of the bits in the match vectors may represent the offsets of the corresponding database entries. For instance, bits with bit positions 0-d in a match vector may represent database entries 0-d in a database, respectively.

In the example embodiment shown in FIG. 2, a search of ingress variable ACL database 30 with ingress variable search key 31 generates an ingress variable match vector 32 with d bits, and each bit represents one of the entries in ingress variable ACL database 30. The values of the bits indicate which ingress variable database entries produced a hit (e.g., binary '1') by ingress variable search key 31 and which ingress variable database entries produced a miss (e.g., binary '0'). Also, the bit positions of the bits can represent the offsets of the corresponding ingress variable database entries. For example, if ingress variable search key 31 matches ingress variable database entry 35 (e.g., $n^{th}$ entry), then the bit at bit position n of ingress variable match vector 32 can be set to a binary '1' to indicate a hit at entry n of ingress variable ACL database 30.

A search of egress variable ACL database 50 with egress variable search key 51 generates an egress variable match vector 52 with d bits, and each bit represents one of the database entries in egress variable ACL database 50. The values of the bits indicate which egress variable database entries produced a hit (e.g., binary '1') by egress variable search key 31 and which egress variable database entries produced a miss (e.g., binary '0'). Also, the bit positions of the bits can represent the offsets of the corresponding egress variable database entries. For example, if egress variable search key 51 matches egress variable database entry 55 (e.g., $n^{th}$ entry), then the bit at bit position n of egress variable match vector 52 can be set to a binary '1' to indicate a hit at entry n of egress variable ACL database 50.

A search of constant ACL database 40 with constant search key 41 generates a constant match vector 42 with d bits, and each bit represents one of the entries in constant ACL database 40. The values of the bits indicate which constant database entries produced a hit (e.g., binary '1') by constant search key 41 and which constant database entries produced a miss (e.g., binary '0'). Also, the bit positions of the bits can represent the offsets of the corresponding constant database entries. For example, if constant search key 41 matches constant database entry 45 (e.g., $n^{th}$ entry), then the bit at bit position n of constant match vector 42 can be set to a binary '1' to indicate a hit at entry n of constant ACL database 40. In some implementations, constant match vector 42 may be stored in a constant match vector store 44 until an egress ACL search is performed, producing egress variable match vector 52, which can be merged with constant match vector 42.

As described herein, databases 30, 40, and 50 of system 10 may be implemented in any suitable memory element. For instance, in a hardware implementation of system 10, databases 30, 40, and 50 may be implemented in ternary content addressable memory (TCAM). TCAM can provide a search through a database by simultaneously comparing a search key to every entry in the database. Thus, searching any of the databases 30, 40, and 50 may be a parallel process in certain implementations.

The database structure shown in FIGS. 1 and 2 allows constant database 40 to be searched a single time for each message that is evaluated at ingress and egress of ACL network node 20. The resulting constant match vector 42 may be shared and used for deriving both ingress and egress ACL search results. More specifically, constant match vector 42 can be compared (or merged) with ingress variable match vector 32 and with egress variable match vector 52, to determine whether any corresponding database entries were identified during the respective ingress and egress ACL searches. In one example embodiment, an ingress merged match vector 33 can be the bitwise logical AND of the match vector results from ingress variable ACL database 30 and constant ACL database 40, as indicated by AND gate 38. Similarly, an egress merged match vector 53 can be the bitwise logical AND of the match vector results from egress variable ACL database 50 and constant ACL database 40, as indicated by AND gate 58. The resulting ingress merged match vector 33 can indicate each ingress ACL rule in which corresponding parts of the rule were identified based on searches with respective search keys 31 and 41, indicated as a 'hit' in the respective ingress variable and constant match vectors, and correlated based on having the same offset. Similarly, the resulting egress merged match vector 53 can indicate each egress ACL rule in which corresponding parts of the rule were identified based on searches with respective search keys 51 and 41, indicated as a 'hit' in the respective egress variable and constant match vectors, and correlated based on having the same offset.

Ingress merged match vector 33 can be priority encoded to determine the address of the highest priority match, if any, of an ingress ACL rule. Likewise, egress merged match vector 53 can be priority encoded to determine the address of the highest priority match, if any, of an egress ACL rule. In one example implementation, the entries in the ACL databases are arranged in descending priority such that the entries with the lowest addresses have the highest priority. Accordingly, priority encoder 39 can determine the first hit entry with the lowest address from ingress merged match vector 33 to produce ingress match index 34 with log 2(d) bits. Similarly, priority encoder 59 can determine the first hit entry with the lowest address from egress merged match vector 53 to produce egress match index 54 with log 2(d) bits. Alternatively, any other suitable form of prioritization could be configured in system 10. Match indexes 34 and 54 can each be used to look up an associated ACL action in ACL actions 60 to be performed.

Valid fields 35*b* and 55*b* of respective ingress and egress variable ACL databases 30 and 50 allow any given bidirectional ACL entry (e.g., nth entries 35, 45, and 55 of databases 30, 40, and 50) to be programmable for use solely for ingress ACL searches, solely for egress ACL searches, for both ingress and egress ACL searches, or for no searches. When a bidirectional entry is programmed as ingress-only, the entry in ingress variable ACL database 30 is included in the ingress variable ACL search, while the corresponding entry in egress variable ACL database 50 is excluded during the egress variable ACL search. Conversely, when a bidirectional entry is programmed as egress-only, the entry in egress variable ACL database 50 is included in the egress variable ACL search, while the corresponding entry in ingress variable ACL database 30 is excluded during the ingress variable ACL search. This programmability of bidirectional ACL entries in hardware-based bidirectional ACLs can provide the hardware agility to meet a wide range of customer ACL specifications at minimum hardware costs.

In one example embodiment that provides this programmability of bidirectional ACL entries, a bidirectional ACL entry (e.g., nth entries 35, 45, and 55 of databases 30, 40, and 50) may be programmed as ingress-only when valid field 35*b* of ingress variable ACL entry 35 is set (e.g., binary '1') and valid field 55*b* of egress variable ACL entry 55 is cleared (e.g., binary '0'). Conversely, the bidirectional ACL entry may be programmed as an egress-only when valid field 55*b* of egress variable ACL entry 55 is set (e.g., binary '1') and valid field 35*b* of ingress variable ACL entry 35 is cleared (e.g., binary '0'). Both ingress and egress ACL searches may be performed for a given bidirectional ACL entry when both valid fields of the bidirectional ACL entry (e.g., valid fields 35*b* and 55*b* of ingress and egress variable ACL entries 35 and 55) are set (e.g., binary '1').

It should be noted that references herein regarding 'setting' a valid field of a variable ACL database entry refer to assigning any suitable value (e.g., binary '1', binary '0') to the valid field to indicate the corresponding ACL database entry is valid and should be included in a search of the ACL database. Conversely, references herein regarding 'clearing' a valid field of a variable ACL database entry refer to assigning any suitable value (e.g., binary '1', binary '0') to the valid field to indicate the corresponding ACL database entry is not valid and should not be included in a search of the ACL database. Moreover, the valid fields could alternatively be configured with more than one bit, and therefore, the bidirectional databases could be implemented to use other values to 'set' or to 'clear' the valid fields. The valid fields of ingress and egress search keys 31 and 51 may be set to enable a hit on a valid entry (i.e., when the valid bit of the entry is set) in a variable ACL database, if the variable fields of the particular entry match the search key fields of the corresponding search key.

The database structure of system 10 effectively eliminates duplicate storing and searching of constant fields in a conventional bidirectional ACL database. Instead, the embodiments described herein provide a single constant ACL database 40, which can be searched once for each message. The resulting constant match vector 42 can be shared for ingress and egress ACL searches. As a result of this innovation, resources used for duplicate constant fields are freed up and may be used to support additional bidirectional ACL database entries. Furthermore, even if the number of entries is not increased, the new configuration is beneficial because resource requirements are reduced as a result of removing the duplicate fields.

To illustrate this effect, assume that ingress variable ACL database 30 requires X area, egress variable ACL database 50 requires Y area, and constant ACL database requires Z area. Therefore, the total hardware area equals X+Y+Z. Duplicated constant fields in separate ingress and egress ACL databases, however, result in a total hardware area equaling X+Y+(2*Z). Typically, constant ACL fields constitute a significant amount of the bidirectional ACL database entries and, therefore, reducing (2*Z) by half can achieve a significant hardware gain. Moreover, the database structure of system 10 adds no latency and does not compromise throughput for both hardware and software implementations. Hardware utilization can be significantly enhanced for hardware-based bidirectional ACL designs and can be extended to software implementations. In particular, in a software implementation, avoiding a second search through constant fields for each message may reduce search times, thereby improving latency and throughput.

Figure 3:
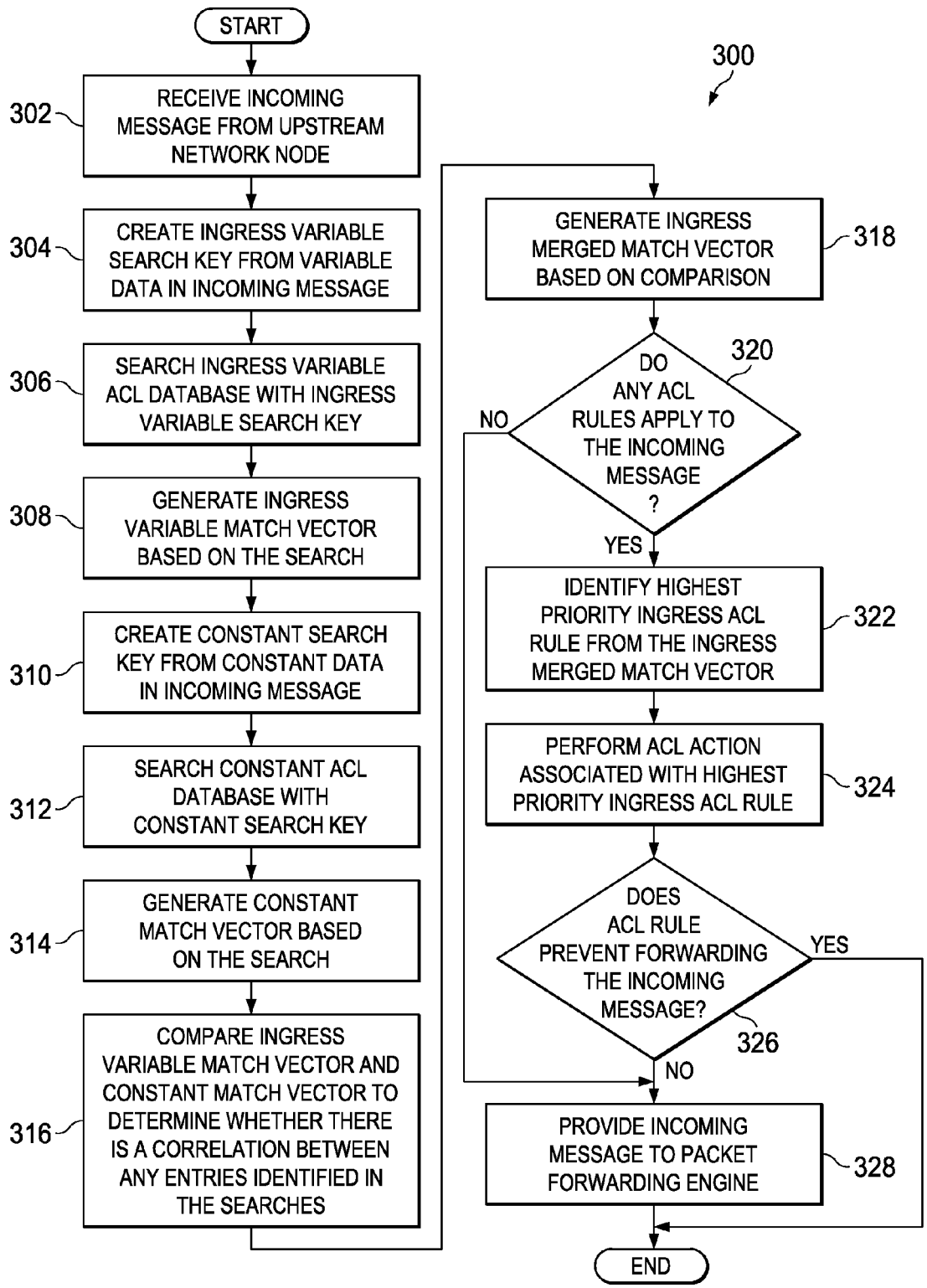
FIG. 3 is a simplified flow chart illustrating example operational steps that may be associated with ingress traffic flow in example embodiments of the system.

Turning to FIG. 3, a flow 300 illustrates example operational steps that may be performed on ingress when a message is received by ACL network node 20 of system 10. Flow 300 may begin at 302 where a message (e.g., incoming message 15) is received at incoming interface 21 of ACL network node 20 from upstream network node 12.

In one embodiment, ingress ACL module 22 may be configured to perform the remaining operational steps of flow 300. Ingress variable search key 31 can be created at 304, with valid field 31b set (e.g., binary '1') and ingress variable search key fields 31a derived from variable data (e.g., from layer 2 and/or layer 3 of a TCP/IP protocol message) of incoming message 15. At 306, ingress variable ACL database 30 can be searched with ingress variable search key 31.

Ingress variable match vector 32 can be generated, as indicated at 308, from searching ingress variable ACL database 30 with ingress variable search key 31. In one example implementation, for each ingress variable database entry that matches (or is otherwise identified as a hit by) ingress variable search key 31, a bit may be set (e.g., binary '1') in ingress variable match vector 32. Conversely, for each entry that does not match (and is not otherwise identified as a hit by) ingress variable search key 31, a bit may be cleared (e.g., binary '0') in ingress variable match vector 32. Additionally, a bit that is set or cleared in ingress variable match vector 32 may have a bit position in the vector that corresponds to the offset of the database entry it represents in ingress variable ACL database 30 (e.g., bit position n for ingress variable database entry 35).

In one embodiment, a valid field (e.g., valid field 35b) of each ingress variable database entry is evaluated to determine whether the particular entry should be included in the search. For example, if valid field 35b is '1', then ingress variable database entry 35 may be evaluated in the search, and a bit in ingress variable match vector 32 can be set or cleared based on whether database entry 35 was a hit or miss, respectively. On the other hand, if valid field 35b is '0', then ingress variable database entry 35 may not be evaluated in the search and the bit in ingress variable match vector 32 may be cleared (e.g., binary '0'), indicating that database entry 35 was a miss.

At 310, constant search key 41 can be created with constant search key fields 41a derived from the constant data (e.g., from layer 4 and/or 5 of a TCP/IP protocol message) of incoming message 15. At 312, constant ACL database 40 can be searched with constant search key 41. Constant match vector 42 can be generated, as indicated at 314, from searching constant ACL database 40 with constant search key 41. In one example implementation, for each constant database entry that matches (or is otherwise identified as a hit by) constant search key 41, a bit may be set (e.g., binary '1') in constant match vector 42. Conversely, for each entry that does not match (and is not otherwise identified as a hit by) constant search key 41, a bit may be cleared (e.g., binary '0') in constant match vector 42. Additionally, a bit that is set or cleared in constant match vector 42 may have a bit position in the vector that corresponds to the offset of the database entry in constant ACL database 40. Although operations for the ingress ACL search and the constant ACL search are illustrated sequentially in FIG. 3, the searches could be performed simultaneously or in any other suitable overlapping or sequential timing arrangement.

Once ingress variable match vector 32 and constant match vector 42 have been generated, at 316 the match vectors may be compared to determine whether there is a correlation between any ingress variable database entries and constant database entries identified in the searches. One example correlation can be a determination that an ingress variable database entry (identified in the search of ingress variable ACL database 30) has the same offset as a constant database entry (identified in the search of constant ACL database 40). This correlation may be determined if the bit positions of the bits representing the database entries are the same in ingress variable match vector 32 and constant match vector 42. An identified correlation indicates that an ingress ACL rule is applicable to incoming message 15. In a hardware implementation, the comparison of match vectors 32 and 42 may be performed by a bitwise logical AND of the two vectors via AND gate 38. At 318, ingress merged match vector 33 is generated as a result of the operation of AND gate 38 on the two vectors. Thus, it is possible for multiple correlations to be identified, in which case multiple ingress ACL rules may be applicable to incoming message 15.

At 320, a determination is made as to whether any ingress ACL rules apply to incoming message 15. For example, if one or more of the bits in ingress merged match vector 33 are set to '1', then an ingress ACL rule should be applied to incoming message 15. Accordingly, at 322, the highest priority ingress ACL rule indicated in ingress merged match vector 33 is identified. This identification may be achieved by priority encoder 39, which can priority encode the vector to determine the address of the highest priority ingress ACL rule (e.g., the first hit index) indicated by ingress merged match vector 33, and thereby produce ingress match index 34. Ingress match index 34 can be used to look up an ACL action (e.g., permit traffic, deny traffic, etc.) that is associated with match index 34 in ACL actions 60.

At 324, the ACL action, which may be associated with the highest priority ingress ACL rule applicable to the message, can be performed. For instance, the message could be denied or permitted, or any other suitable action could be taken. At 326, a determination is made as to whether the identified ingress ACL rule and associated action prevent forwarding incoming message 15. For example, if the ACL action taken at 324 effectively drops or blocks the message, then the message is denied further processing in ACL network node 20 and flow 300 ends. Otherwise, if the ACL action taken at 324 does not block or drop the message, or if it is determined at 320 that no ingress ACL rules apply to the message, then at 328, the message is provided to message forwarding engine 25. Message forwarding engine 25 can forward the message by bridging or routing, and can provide the forwarded message (e.g., outgoing message 17) to outgoing interface 23 for transmission to a downstream node 14.

Figure 4:
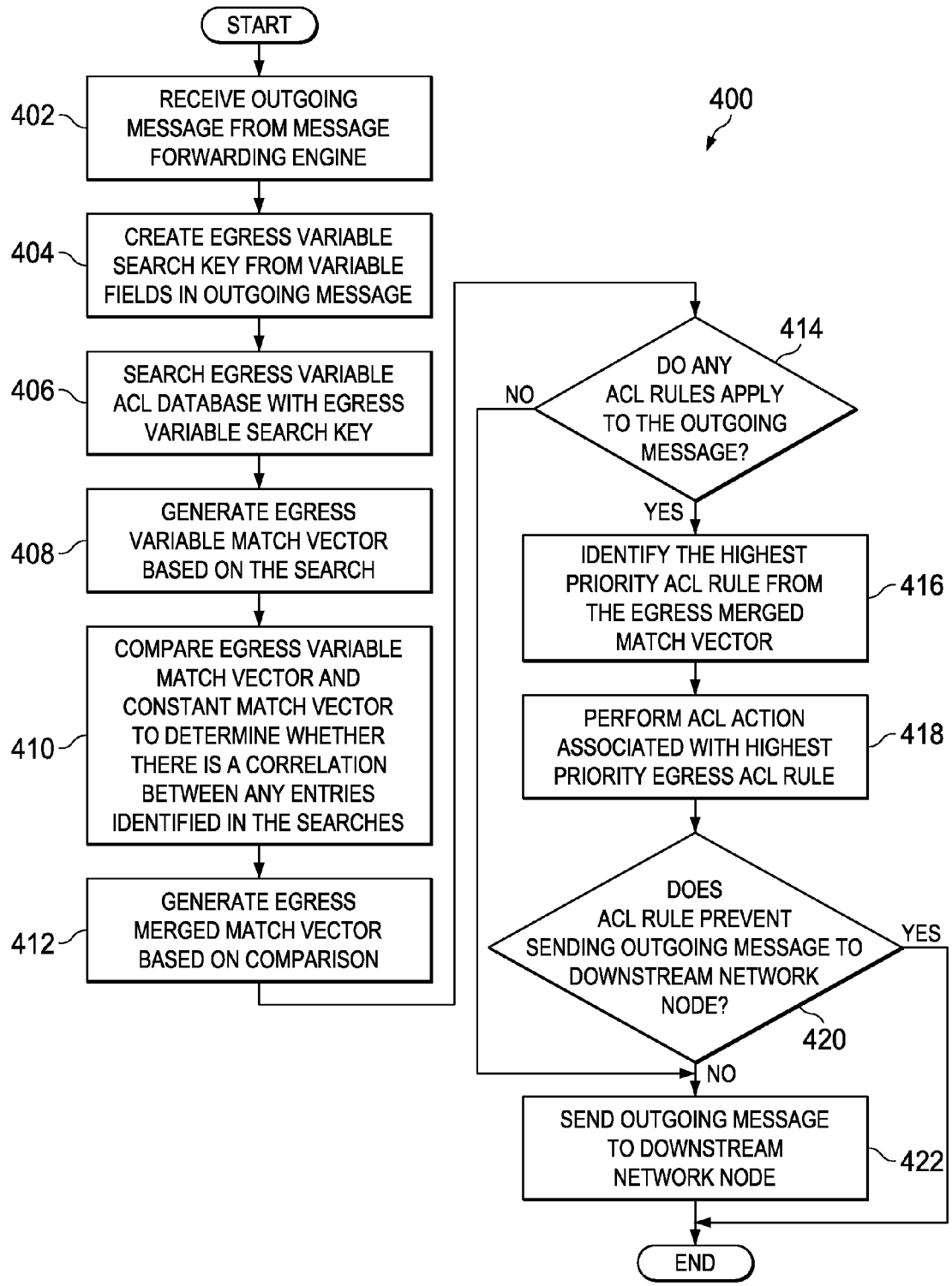
FIG. 4 is a simplified flow chart illustrating example operational steps that may be associated with egress traffic flow in example embodiments of the system.

Turning to FIG. 4, a flow 400 illustrates example operational steps that may be performed on egress after forwarding a message in ACL network node 20 of system 10. Flow 400 may begin at 402, after forwarding logic of message forwarding engine 25 has been applied to a message (e.g., incoming message 15). At 402, outgoing interface 23 may receive outgoing message 17 from message forwarding engine 25. Outgoing message 17 may contain variable data that has been modified and constant data that has not changed from incoming message 15. For example, outgoing message 17 may contain the segment and application data (e.g., layers 4 and higher) of incoming message 15, but have a new frame (e.g., layer 2) and/or network addressing (e.g., layer 3).

In one embodiment, egress ACL module 24 may be configured to perform the operational steps of flow 400 after outgoing interface 23 receives the outgoing message 17 at 402 and prior to sending the message to downstream network node 14 at 422. At 404, egress variable search key 51 can be created with valid field 51b set (e.g., binary '1') and egress variable search key fields 51a derived from the variable data (e.g., from layer 2 and/or layer 3 of a TCP/IP protocol message) of outgoing message 17. At 406, egress variable ACL database 50 can be searched with egress variable search key 51.

Egress variable match vector 52 can be generated, as indicated at 408, from searching egress variable ACL database 50 with egress variable search key 51. In one example implementation, for each egress variable database entry that matches (or is otherwise identified as a hit by) egress variable search key 51, a bit may be set (e.g., binary '1') in egress variable match vector 52. Conversely, for each entry that does not match (and is not otherwise identified as a hit by) egress variable search key 51, a bit may be cleared (e.g., binary '0') in egress variable match vector 52. Additionally, a bit that is set or cleared in egress variable match vector 52 may have a bit position in the vector that corresponds to the offset of the database entry it represents in egress variable ACL database 50 (e.g., bit position n for egress variable database entry 55).

In one embodiment, a valid field (e.g., valid field 55*b*) of each egress variable database entry is evaluated to determine whether the particular entry should be included in the search. For example, if valid field 55*b* is '1', then egress variable database entry 55 may be evaluated in the search, and a bit in egress variable match vector 52 can be set or cleared based on whether database entry 55 was a hit or miss, respectively. On the other hand, if valid field 55*b* is '0', then egress variable database entry 55 may not be evaluated in the search and the bit in egress variable match vector 52 may be cleared (e.g., binary '0'), indicating that database entry 55 was a miss.

Constant match vector 42 may be created by ingress ACL module 22 prior to searching egress variable ACL database 50 at 406 and generating egress variable match vector 52 at 408. Additionally, constant match vector 42 may be stored in optional constant match vector store 44 until an egress variable match vector 52 has been generated. Accordingly, once egress variable match vector 52 has been generated at 408, at 410 egress variable match vector 52 and constant match vector 42 may be compared to determine whether there is a correlation between any egress variable database entries and constant database entries identified in the searches. One example correlation can be a determination that an egress variable database entry (identified in the search of egress variable ACL database 50) has the same offset as a constant database entry (identified in the search of constant ACL database 40). This correlation may be determined if the bit positions of the bits representing the database entries are the same in egress variable match vector 52 and constant match vector 42. An identified correlation indicates that an egress ACL rule is applicable to outgoing message 17. In a hardware implementation, the comparison of match vectors 52 and 42 may be performed by a bitwise logical AND of the two vectors via AND gate 58. At 412, egress merged match vector 53 is generated as a result of the operation of AND gate 58 on the two vectors. Thus, it is possible for multiple correlations to be identified, in which case multiple egress ACL rules may be applicable to outgoing message 17.

At 414, a determination is made as to whether any egress ACL rules apply to outgoing message 17. For example, if one or more of the bits in egress merged match vector 53 are set to '1', then an egress ACL rule should be applied to outgoing message 17. Accordingly, at 416, the highest priority egress ACL rule indicated in egress merged match vector 53 is identified. This identification may be achieved by priority encoder 59, which can priority encode the vector to determine the address of the highest priority egress ACL rule (e.g., first hit index) indicated by egress merged match vector 53, and thereby produce egress match index 54. Egress match index 54 can be used to look up an ACL action (e.g., permit traffic, deny traffic, etc.) that is associated with match index 54 in ACL actions 60.

At 418, the ACL action, which may be associated with the highest priority egress ACL rule applicable to the message, can be performed. For instance, the message could be denied or permitted, or any other suitable action could be taken. At 420, a determination is made as to whether the identified egress ACL rule and associated action prevent sending outgoing message 17 to downstream network node 14. For example, if the ACL action taken at 418 effectively drops or blocks the message, then the message is denied further processing in ACL network node 20 and flow 400 ends. Otherwise, if the ACL action taken at 418 does not drop or block the message, or if it is determined at 414 that no egress ACL rules apply to the message, then at 422, the message (e.g., outgoing message 17) is sent to downstream network node 14.

In some embodiments, one or more of the features of system 10 may be implemented in hardware in, for example ACL network node 20. In some example implementations, however, at least some portions of the activities related to the system, outlined herein may be implemented in software. In some embodiments, this software could be received or downloaded from a web server, provided on computer-readable media, or configured by a manufacturer of a particular element (e.g., ACL network node 20) in order to provide this system for improving hardware utilization for a bidirectional ACL. In other embodiments, one or more of these features may be provided external to these elements, or consolidated in any appropriate manner to achieve the intended functionality.

In the embodiments of system 10, described and shown herein, the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that system 10, as shown in the FIGURES, and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to 'one embodiment', 'example embodiment', 'an embodiment', 'another embodiment', 'some embodiments', 'various embodiments', 'other embodiments', 'alternative embodiment', etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    creating a first search key from one or more variable data contained within a message received in a network environment;
    creating a second search key from one or more constant data contained within the message;
    identifying a first database entry in a first Access Control List ("ACL") database based on the first search key;
    identifying a second database entry in a ACL second database based on the second search key; and
    creating a merged database entry when a correlation is identified between the first and second database entries,
    wherein the identifying the first database entry comprises:
        generating a variable match vector, the variable match vector comprising a plurality of bits each representing a database entry of the first ACL database; and
        setting, in the variable match vector, a bit representing the first database entry, and
    wherein the identifying the second database entry comprises:
        generating a constant match vector, the constant match vector comprising a plurality of bits each representing a database entry of the second ACL database; and
        setting, in the constant match vector, a bit representing the second database entry.

2. The method of claim 1, wherein, when the message is forwarded, the one or more variable data are modified and the one or more constant data are not modified.

3. The method of claim 2, wherein the first search key is created prior to forwarding the message.

4. The method of claim 2, wherein the first search key is created after forwarding the message.

5. The method of claim 1, wherein the correlation is identified when an offset of the first database entry in the first ACL database is the same as an offset of the second database entry in the second ACL database as indicated by the variable match vector being the same as the constant match vector.

6. The method of claim 1, wherein the correlation is identified by comparing the variable match vector with the constant match vector.

7. The method of claim 6, wherein the comparing is a bitwise logical AND operation.

8. The method of claim 3, further comprising:
    creating a third search key from the one or more variable data from the message;
    identifying a third database entry in a third ACL database based on the third search key; and
    taking an action associated with the third database entry when a correlation is identified between the third database entry and the second database entry.

9. The method of claim 1, wherein the first database entry:
    includes a valid field and a variable field; and
    is not identified when the valid field of the first database entry is not set.

10. The method of claim 1, further comprising:
    identifying one or more other first database entries in the first ACL database based on the first search key;
    identifying one or more other second database entries in the second ACL database based on the second search key;
    identifying one or more other correlations, respectively, between the one or more other first database entries and the one or more other second database entries; and
    determining a rule associated with the correlation is higher in priority than one or more other rules associated with the one or more other correlations.

11. Logic encoded in one or more non-transitory computer-readable media that includes code for execution and when executed by a processor is operable to perform operations comprising:
    creating a first search key from one or more variable data contained within a message received in a network environment;
    creating a second search key from one or more constant data contained within the message;
    identifying a first database entry in a first Access Control List ("ACL") database based on the first search key;
    identifying a second database entry in a ACL second database based on the second search key; and
    creating a merged database entry when a correlation is identified between the first and second database entries,
    wherein the identifying the first database entry comprises:
        generating a variable match vector, the variable match vector comprising a plurality of bits each representing a database entry of the first ACL database; and
        setting, in the variable match vector, a bit representing the first database entry, and
    wherein the identifying the second database entry comprises:
        generating a constant match vector, the constant match vector comprising a plurality of bits each representing a database entry of the second ACL database; and
        setting, in the constant match vector, a bit representing the second database entry.

12. The logic of claim 11, wherein the code for execution, when executed by a processor, is operable to perform further operations comprising:
    creating a third search key from the one or more variable data from the message;
    identifying a third database entry in a third ACL database based on the third search key; and
    taking an action associated with the third database entry when a correlation is identified between the third database entry and the second database entry.

13. An apparatus, comprising:
a memory element configured to store data; a processor operable to execute instructions associated with the data; and
a first access control list (ACL) module configured to interface with the memory element and the processor, wherein the apparatus is configured to:
create a first search key from one or more variable data contained within a message received in a network environment;
create a second search key from one or more constant data contained within the message;
identify a first database entry in a first Access Control List ("ACL") database based on the first search key;
identify a second database entry in a ACL second database based on the second search key; and
create a merged database entry when a correlation is identified between the first and second database entries,
wherein the identifying the first database entry comprises:
generating a variable match vector, the variable match vector comprising a plurality of bits each representing a database entry of the first ACL database; and
setting, in the variable match vector, a bit representing the first database entry, and
wherein the identifying the second database entry comprises:
generating a constant match vector, the constant match vector comprising a plurality of bits each representing a database entry of the second ACL database; and
setting, in the constant match vector, a bit representing the second database entry.

14. The apparatus of claim 13, wherein, when the message is forwarded, the one or more variable data are modified and the one or more constant data are not modified.

15. The apparatus of claim 14, wherein the first search key is created prior to forwarding the message.

16. The apparatus of claim 14, wherein the first search key is created after forwarding the message.

17. The apparatus of claim 13, wherein the correlation is identified when an offset of the first database entry in the first ACL database is the same as an offset of the second database entry in the second ACL database as indicated by the variable match vector being the same as the constant match vector.

18. The apparatus of claim 13, wherein the apparatus is further configured to:
create a third search key from the one or more variable data from the message;
identify identifying a third database entry in a third ACL database based on the third search key; and
perform an action associated with the third database entry when a correlation is identified between the third database entry and the second database entry.

19. The apparatus of claim 13, wherein the first database entry:
includes a valid field and a variable field; and
is not identified when the valid field of the first database entry is not set.

* * * * *